United States Patent
Pfeiffer et al.

(10) Patent No.: US 11,810,370 B2
(45) Date of Patent: Nov. 7, 2023

(54) TECHNIQUES FOR IDENTIFYING CURBS

(71) Applicant: Zoox, Inc., Foster City, CA (US)

(72) Inventors: David Pfeiffer, Foster City, CA (US); Zeng Wang, Menlo Park, CA (US); Qiang Zhai, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 71 days.

(21) Appl. No.: 17/364,078

(22) Filed: Jun. 30, 2021

(65) Prior Publication Data

US 2023/0004744 A1 Jan. 5, 2023

(51) Int. Cl.
| | |
|---|---|
| *G06V 20/56* | (2022.01) |
| *G01S 17/10* | (2020.01) |
| *G01S 7/48* | (2006.01) |
| *B60W 50/14* | (2020.01) |
| *G01S 17/86* | (2020.01) |

(52) U.S. Cl.
CPC ........... *G06V 20/588* (2022.01); *B60W 50/14* (2013.01); *G01S 7/4808* (2013.01); *G01S 17/10* (2013.01); *G01S 17/86* (2020.01); *B60W 2420/42* (2013.01); *B60W 2420/52* (2013.01)

(58) Field of Classification Search
CPC ................ G06V 20/588; B60W 50/14; B60W 2420/42; B60W 2420/52; G01S 7/4808; G01S 17/10; G01S 17/86
See application file for complete search history.

(56) References Cited

U.S. PATENT DOCUMENTS

| | | | |
|---|---|---|---|
| 10,176,388 B1 | 1/2019 | Ghafarianzadeh et al. | |
| 2010/0017060 A1 | 1/2010 | Zhang et al. | |
| 2016/0026184 A1 | 1/2016 | Stainvas Olshansky et al. | |
| 2021/0174579 A1* | 6/2021 | Wakimoto | G01B 11/24 |
| 2022/0063669 A1* | 3/2022 | Fukushige | B60W 40/105 |

FOREIGN PATENT DOCUMENTS

| | | |
|---|---|---|
| CN | 109522804 A | 3/2019 |
| CN | 110376604 A | 10/2019 |
| KR | 20130088987 A | 8/2013 |

OTHER PUBLICATIONS

U.S. Appl. No. 17/246,258, Das, et al., filed Apr. 30, 2021, titled "Object Detection and Tracking, Including Parallelized Lidar Semantic Segmentation", 63 pages.
PCT Search Report and Written Opinion dated Sep. 22, 2022 for PCT application No. PCT/US2022/033205, 12 pages.

\* cited by examiner

*Primary Examiner* — Nam D Pham
(74) *Attorney, Agent, or Firm* — Lee & Hayes, P.C.

(57) ABSTRACT

Techniques for identifying curbs are discussed herein. For instance, a vehicle may generate sensor data using one or more sensors, where the sensor data represents points associated with a driving surface and a sidewalk. The vehicle may then quantize the points into distance bins that are located laterally along the driving direction of the vehicle in order to generate spatial lines. Next, the vehicle may determine separation points for the spatial lines, where the separation points are configured to separate the points associated with the driving surface from the points associated with the sidewalk. The vehicle may then generate, using the separation points, a curve that represents the curb between the driving surface and the sidewalk. This way, the vehicle may use the curve while navigating, such as to avoid the curb and/or stop at a location that is proximate to the curb.

20 Claims, 8 Drawing Sheets

TECHNIQUES FOR IDENTIFYING CURBS

BACKGROUND

An autonomous vehicle may be configured to navigate from a first location to a second location along a path. For example, when providing a user with a ride, the autonomous vehicle may be configured to pick the user up at a pick-up location and navigate, along a path, to a destination location for dropping the user off. While navigating, it may be important for the autonomous vehicle to determine the locations of curbs. For instance, the autonomous vehicle may need to determine the locations of the curbs so that that autonomous vehicle avoids the curbs while navigating. Additionally, and for safety reasons, the autonomous vehicle may need to determine the locations of the curbs so that the autonomous vehicle is able to pick the user up and/or drop the user off at a location that is proximate to a curb.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
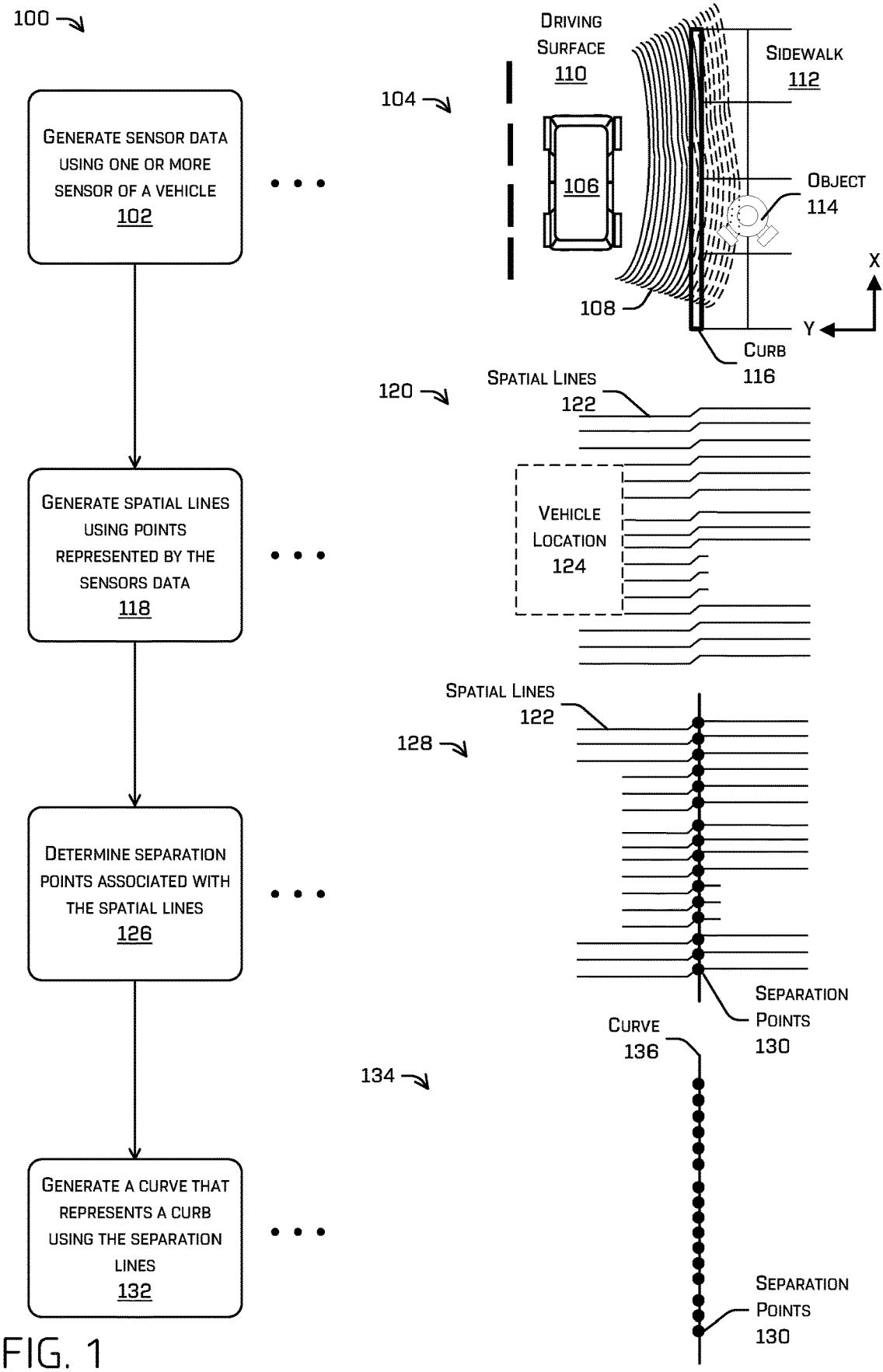
FIG. 1 is a pictorial flow diagram of an example process for identifying curbs within an environment.

As discussed above, an autonomous vehicle may be configured to navigate from a first location to a second location along a path. For instance, when providing a user with a ride, the autonomous vehicle may be configured to pick the user up at a pick-up location and navigate, along a path, to a destination location for dropping the user off. While navigating, it may be important for the autonomous vehicle to determine the locations of curbs. In examples, the autonomous vehicle may need to determine the locations of the cubs so that the autonomous vehicle avoids the curbs while navigating. The autonomous vehicle may need to determine the locations of the curbs so that the autonomous vehicle is able to pick a user up and/or drop a user off at a location that is proximate to a curb.

As such, the present application relates to techniques for identifying curbs. For instance, a vehicle may generate sensor data using one or more sensors, such as one or more lidar, image, radar, or other sensors. In some examples, the sensor data may represent locations of points within an environment (e.g., x-coordinates, y-coordinates, and z-coordinates associated with points) and probabilities associated with the points. The vehicle may then analyze the sensor data in order to identify points that are associated with driving surface(s) for the vehicle and points that are associated with sidewalk(s). Based on identifying the points, the vehicle may use the points to generate spatial lines that represent the environment. The vehicle may then analyze the spatial lines in order to identify, for each spatial line, a respective separation point that separates the points associated with the driving surface(s) from the points associated with the sidewalk(s). Using the separation points for the spatial lines, the vehicle may then generate a curve that represents a curb between the driving surface(s) and the sidewalk(s). The vehicle may then use the curve to navigate in order avoid the curb and/or in order to determine a location for stopping that is proximate to the curb.

For more detail, the vehicle may include one or more sensors that the vehicle can use to generate sensor data. The one or more sensor may include, but are not limited to, light detection and ranging (lidar) sensor(s), radar sensor(s), ultrasound, time-of-flight sensor(s), imaging device(s) (e.g., camera(s)), and/or any other type of sensor. In some examples, the sensor data may represent at least locations of points (which may be referred to, in examples, as "first points") within an environment for which the vehicle is located and probabilities associated with accuracies of the locations of the first points. In some examples, the sensor data may be input to a model to determine classifications for objects associated with the first points. For example, and for a first point, the vehicle may (1) generate the sensor data that represents at least the coordinate location (e.g., the x-coordinate, the y-coordinate, and the z-coordinate) of the of the first point with respect to the vehicle and a probability or confidence value that the location of the first point is accurate and (2) a classification of an object associated with the first point. As described herein, the classification may include, but is not limited to, a driving surface, a sidewalk, a person, another vehicle, a building, a street sign, and/or any other type of object that may be located within the environment for which the vehicle is navigating.

In some examples, the vehicle may generate the sensor data representing the first points over a period of time. The period of time may include, but is not limited to, one millisecond, fifty milliseconds, one second, five seconds, and/or any other period of time. By generating the sensor data over the period of time, the vehicle may capture a greater number of the first points, which may better represent the environment surrounding the vehicle.

The vehicle may then analyze the sensor data in order to identify points (referred to, in examples, as "second points") for identifying curbs within the environment. In some examples, the vehicle may analyze the sensor data in order to identify second points that are associated with specific classifications. For example, the vehicle may analyze the sensor data in order to identify second points that are associated with classifications such as driving surfaces and sidewalks, but discard the first points that are associated with other classifications. This is because, as described in more detail below, the vehicle can use points associated with driving surfaces and sidewalks to identify curbs. Additionally, or alternatively, in some examples, the vehicle may analyze the sensor data in order to identify second points that are associated with probabilities that satisfy (e.g., that are equal to or greater than) a threshold probability. For example, if the threshold probability is 99%, then the vehicle may analyze the sensor data in order to identify second points that are associated with probabilities that are equal to or greater than 99%, but discard the first points that are associated with probabilities that are less than 99%. This is because the vehicle may only use points that for which the vehicle has a high confidence of accuracy in order to identify curbs.

Additionally, or alternatively, in some examples, the vehicle may analyze the sensor data in order to identify second points that are located within a threshold distance to the vehicle. The threshold distance may include, but is not limited to, one meter, five meters, ten meters, and/or any other distance. For example, such as when the threshold distance includes ten meters, the vehicle may analyze the sensor data in order to identify second points that are associated with locations that are within ten meters from the vehicle, but discard the first points that are associated with locations that are farther than ten meters from the vehicle. This is because the vehicle may use locations of curbs that are proximate to the vehicle while navigating.

The vehicle may then use the second points in order to generate spatial lines. In some examples, to generate the spatial lines, the vehicle may quantize the second points into distance bins that are located laterally along the driving direction of the vehicle (e.g., located along the x-direction with respect to the vehicle). For example, each of the distance bins may include a specific lateral distance along the driving direction. As described herein, the lateral distance may include, but is not limited to, ten centimeters, twenty centimeters, fifty centimeters, one hundred centimeters, and/or any other distance. The vehicle may then quantize the second points into the distance bins such that all of the second points that fall within a respective distance bin are included in that distance bin. These distance bins may then represent the spatial lines that the vehicle uses for generating the curve that represents a curb.

For instance, and for each spatial line, the vehicle may identify a separation point that separates the second points that are associated with the driving surface(s) from the second points that are associated with the sidewalk(s). This is because, if the environment does include a curb, it will likely be located between the driving surface(s) and the sidewalk(s). In some examples, to identify the separation point for a spatial line, the vehicle may analyze the classifications in order to identify a point along the spatial line (e.g., in the y-direction) that is between the second points associated with the driving surface(s) and the second points associated with the sidewalk(s). The vehicle may then determine that the point that is between the second points associated with the driving surface(s) and the second points associated with the sidewalk(s) includes the separation point for the spatial line.

Additionally, or alternatively, in some examples, to identify the separation point for a spatial line, the vehicle may analyze the sensor data, which again represents the locations (e.g., z-coordinates) associated with the second points, to identify a point along the spatial line (e.g., in the y-direction) at which the locations of the second points rise from a first height (e.g., in the z-direction) to a second height (e.g., in the z-direction). In such examples, the vehicle may use a threshold distance when identifying the rise, such as five centimeters, ten centimeters, twenty centimeters, and/or any other distance. The vehicle may then determine that the point at which the rise occurs includes the separation point for the spatial line.

Additionally, or alternatively, in some examples, to identify the separation point for a spatial line, the vehicle may analyze various points along the spatial line, such as laterally in the y-direction. For each point along the spatial line, the vehicle may assert that all of the second points on one side of the point lay on a first surface line (e.g., a surface line associated with the driving surface(s)) and all points on the other side of the point lay on a second surface line (e.g., a surface line associated with the sidewalk(s)). The vehicle may then determine an energy associated with the point, where the energy is based on the differences between the locations of the second points (e.g., in the z-direction) and the locations of the surface lines. Using the energies of the points, the vehicle may then select the point that includes the maximum energy. This may be because the closer the second points are to the surface lines associated with a point, the higher the energy. However, the farther the second points are from the surface lines associated with a point, the lower the energy. As such, the point that is associated with the maximum energy may be represent the separation point between the driving surface(s) and the sidewalk(s) for the spatial line.

The vehicle may then use the separation points associated with the spatial lines in order to generate the curve that represents the curb. For example, the vehicle may initially determine a curve using the separation points, where the curve includes lines (e.g., straight lines) connecting each of the separation points along the lateral direction of the vehicle. In some examples, the vehicle may then perform additional processing in order to better fit the curve to the curb. For example, the vehicle may then analyze the curve in order to identify at least one separation point that includes an "outlier point" from the rest of the separation points. The vehicle may then analyze the energies associated with additional separation points that are proximate to the outlier point. In some examples, the additional separation points may be proximate to the outlier point based on the additional separation points being within a threshold distance (e.g., 0.5 meters, 1 meter, 2 meters, etc.) to the outlier point. The vehicle may them use the energies to update the position of the outlier point, which is described in more detail below. Additionally, the vehicle may continue to perform these processes in order to more accurately generate the curve that represents curb.

In some examples, the curve may represent a straight and/or substantially straight line that represents the curb. However, in other examples, the curve may not represent a straight and/or substantially straight line. For example, such as at an intersection, the curb may turn at a specific angle. For example, at a four-way stop, the curve may include a 90-degree turn. As such, these processes may still be performed in order to generate curves that represent curbs that are not straight and/or substantially straight. For example, such as when the curb includes a turn, the vehicle may still be able to identify "outlier" point(s) from the rest of the separation points, where the "outlier" points do not fit the turn of the curb. The vehicle may then perform similar processes, as those described herein, to update the positions of the "outlier" point(s) in order to create the curve that represents the turn.

Additionally, in some examples, the vehicle may use one or more profiles in order to generate the curves that represent the curbs. For example, a first profile may be associated with a first type of environment, such as cities, a second profile may be associated with a second type of environment, such as rural areas, a third profile may be associated with a third type of environment, such as freeways, and/or so forth. Each profile may then indicate characteristic(s) of curbs that are likely to be located in the respective environment. For a first example, and using the example above, the first profile may indicate that curbs are likely to include sharp turns at intersections, such as 90-degrees. As such, when navigating through a city, the vehicle may then use the first profile to determine that a curve that includes a sharp turn is probable. For a second example, and again using the example above, the second profile may indicate that curbs are likely to include more circular turns. As such, when navigating through a rural area, the vehicle may use the second profile to determine that a curve that includes a circular turn is more probable than a curve that represents a sharp turn.

Additionally, the vehicle may use the profiles to determine other characteristics associated with the curbs. For example, and again using the example above, the second profile may indicate that curbs are likely to include various heights depending on whether the curbs are associated with driveways, areas located between driveways, pedestrian walkways, and/or the like. As such, when navigating through a rural area, the vehicle may change the threshold distance that the vehicle uses to determine whether a curb exists.

The vehicle may then perform one or more actions based on the curve that represents the curb. For a first example, such as when the vehicle is still navigating to a destination location, the vehicle may use the curve in order to avoid navigating over the curb and/or in order to avoid navigating within a threshold distance to the curb. For a second example, such as when the vehicle is approaching a destination location, the vehicle may use the curve in order to determine a location to stop that is proximate to the curb. While these are just a couple examples of how the vehicle may use the curve to navigate, in other examples, the vehicle may use the curve to perform additional and/or alternative actions.

While the examples above describe generating a curve that represents a curb located on one side of the vehicle, in some examples, the vehicle may perform similar processes in order to generate more than one curve representing more than one curb. For example, the vehicle may perform the processes described above in order to generate a first curve that represents a first curb located to a first side of the vehicle (e.g., a right side of the vehicle) and a second curve that represents a second curb located to a second side of vehicle (e.g., a left side of the vehicle). Additionally, while the examples herein describe generating a curve that represents a curb located between a driving surface and a sidewalk, in other examples, the vehicle may perform similar processes in order to generate a curve that represents a curve between a driving surface and any type of non-driving surface. As described herein, a non-driving surface may include, but is not limited to, a sidewalk, a lawn, a bike lane, and/or any other surface for which the vehicle should not navigate.

By performing the processes described herein, the vehicle may better determine the actual locations of curbs in real time. For example, determining locations of curbs may include using maps or other information indicating historic locations of curbs. However, by using maps, the locations of the curbs may change over a period of time, such as when construction is being performed in an area which may not be accounted for. As such, the maps that the vehicle uses may not be accurate and, as such, the vehicle may be unable to correctly determine the locations of the curbs. As such, by performing the processes described herein, the vehicle is able to accurately determine the locations of curbs without determining the locations of the vehicle and/or without using maps that may be inaccurate for one or more reasons.

Additionally, and as described in more detail below, the vehicle may determine the locations of the curbs using two-dimensional processing techniques, such as when identifying the separation points. This may also provide improvements over techniques that use three-dimensional processing to determine the locations of curbs. For example, it may be more difficult for vehicles to identify curbs using the three-dimensional processing techniques since points are more spread out in the environment and/or the classifications of points may be uncertain. As such, by performing the two-dimensional processing techniques described herein, the vehicle is able to group the points into distance bins and then use the distance bins to identify the separation points for the curbs. As such, the vehicle may use a greater number of separation points to identify the curbs at the different distance bins, which may increase the accuracy when identifying the curb.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In another example, the techniques may be utilized in an aviation or nautical context, or in any system evaluating distances between reference points in an environment (e.g., in a system using route-relative planning). Additionally, the techniques described herein may be used with real data (e.g., captured using sensor(s)), simulated data (e.g., generated by a simulator), or any combination of the two.

FIG. 1 is a pictorial flow diagram of an example process 100 for identifying curbs within an environment. At operation 102, the process 100 may include generating sensor data using one or more sensor of a vehicle. For instance, an example 104 illustrates a vehicle 106 using the sensor(s) to generate the sensor data, which is represented by 108. The one or more sensor may include, but are not limited to, lidar sensor(s), radar sensor(s), imaging device(s) (e.g., camera(s)), and/or any other type of sensor. In some examples, the sensor data may represent at least locations of points within the environment for which the vehicle 106 is located and probabilities associated with accuracies of the points. In some examples, the vehicle 106 may then determine classifications associated with the points, such as by inputting the sensor data into a model that outputs the classifications. Techniques for determining classifications may be found, for example, in U.S. patent application Ser. No. 15/409,841 titled "Spatial and Temporal Information for Semantic Segmentation" and filed Jan. 19, 2017 and U.S. patent application Ser. No. 17/246,258, titled "Object Detecting and Tracking, Including Parallelized Lidar Semantic Segmentation" and filed Apr. 30, 2021, which are incorporated by reference herein in their entirety. In the examples of FIG. 1, the classifications may include at least a driving surface 110 (where the sensor data is represented by the solid lines), a sidewalk 112 (where the sensor data is represented by the dashed lines), and a fire hydrant 114 (where the sensor data is represented by the dotted lines). As shown by the example of FIG. 1, a curb 116 is located between the driving surface 110 and the sidewalk 112.

In the example of FIG. 1, the driving surface 110 may include a street that the vehicle 106 is navigating. However, in other examples, the driving surface 110 may include any other surface for which the vehicle 106 is able to navigate, such as a parking lot, a driveway, and/or the like. Additionally, in some examples, the vehicle 106 may generate the sensor data over a period of time. For example, the vehicle 106 may accumulate the sensor data over multiple lidar spins and/or frames, where the sensor data is adjusted based on the motion of the vehicle 106 over the period of time. As described herein, the period of time may include, but is not limited to, one millisecond, fifty milliseconds, one second, five seconds, and/or any other period of time. By generating the sensor data over the period of time, the vehicle 106 may capture a greater number of the points, which may better represent the environment surrounding the vehicle 106. For example, the vehicle 106 may generate a greater number of the points that represent at least the driving surface 110 and the sidewalk 112.

At operation 118, the process 100 may include generating spatial lines using points represented by the senor data. For instance, an example 120 illustrates the vehicle 106 generating spatial lines 122 using the points represented by the sensor data. In some examples, before generating the spatial lines 122, the vehicle 106 may analyze the sensor data and/or the classifications in order to identify specific points that the vehicle 106 may use to identify the curb 116 within the environment. In examples, the vehicle 106 may analyze the classifications in order to identify points that are associated with specific classifications. For instance, the vehicle 106 may select points that are associated with classifications such as the driving surface 110 and the sidewalk 112, but discard points that are associated with other classifications, such as the fire hydrant 114. Additionally, or alternatively, the vehicle 106 may analyze the sensor data in order to identify points that are associated with probabilities that satisfy (e.g., that are equal to or greater than) a threshold probability. For instance, if the threshold probability is 99%, then the vehicle 106 may select points that are associated with probabilities that are equal to or greater than 99%, but discard points that are associated with probabilities that are less than 99%.

Additionally, or alternatively, the vehicle 106 may analyze the sensor data in order to identify points that are located within a threshold distance to the vehicle 106. As described herein, the threshold distance may include, but is not limited to, one meter, five meters, ten meters, and/or any other distance. For example, such as when the threshold distance includes ten meters, the vehicle 106 may analyze the sensor data in order to identify points that are associated with locations that are within ten meters to the vehicle 106, but discard the first points that are associated with locations that are farther than ten meters from the vehicle 106.

Figure 2:
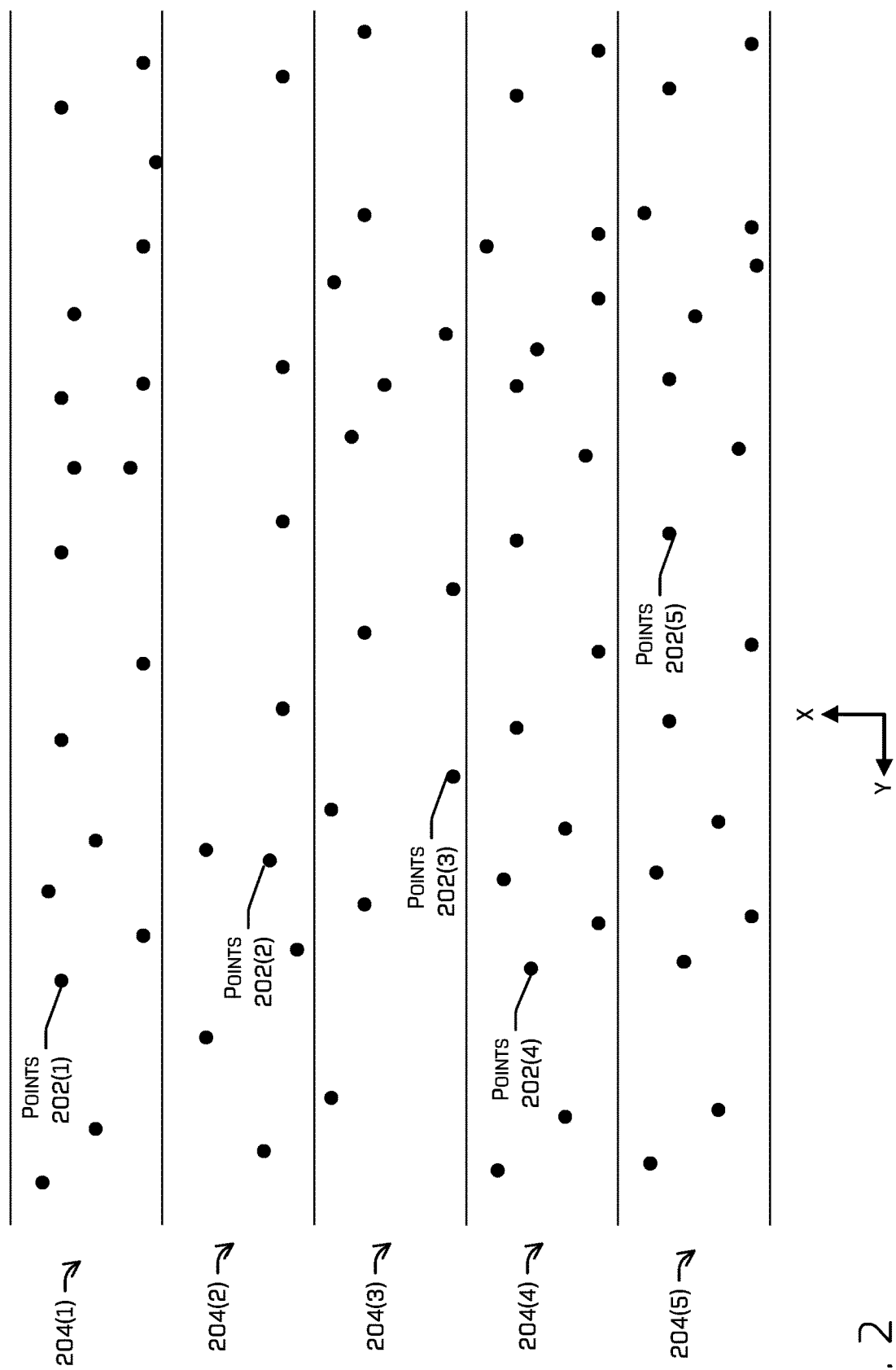
FIG. 2 illustrates an example of generating spatial lines using points represented by sensor data.

As will be described in more detail with regard to FIG. 2, the vehicle 106 may then use the points in order to generate spatial lines 122. In some examples, to generate the spatial lines 122, the vehicle 106 may quantize the points into distance bins that are located laterally along the driving direction of the vehicle 106, where the location of the vehicle 106 is represented by 124. For example, each of the bins may include a specific lateral distance along the driving direction. As described herein, the lateral distance may include, but is not limited to, ten centimeters, twenty centimeters, fifty centimeters, one hundred centimeters, and/or any other distance. The vehicle 106 may then quantize the points into the distance bins such that all of the points that fall within a respective distance bin are included in that distance bin. These distance bins may then represent the spatial lines 122 that the vehicle 106 uses for generating the curve that represents the curb 116.

At operation 126, the process 100 may include determining separation points associated with the spatial lines. For instance, an example 128 illustrates the vehicle 106 determining separation points 130 associated with the spatial lines 122. For example, and as described in more detail with regard to FIG. 3, for each spatial line 122, the vehicle 106 may identify the separation point 130 that separates the points that are associated with the driving surface 110 from the points that are associated with the sidewalk 112. This is because, if the environment does include the curb 116, the curb 116 may be located between the driving surface 110 and the sidewalk 112 (which is represented by the example of FIG. 1). In some examples, to identify the separation point 130, the vehicle 106 may analyze various points along the spatial line 122, such as laterally in the y-direction. For each point along the spatial line 122, the vehicle 106 may assert that all of the points on one side of the point lay on a first surface line (e.g., a surface line associated with the driving surface 110) and all of the points on the other side of the point lay on a second surface line (e.g., a surface line associated with the sidewalk 112).

As will be described in more detail with regard to FIG. 3, the vehicle 106 may then determine an energy associated with the point, where the energy is based on the difference between the locations of the points (e.g., in the z-direction) and the locations of the surface lines. Using the energies of the points, the vehicle 106 may select the point that includes the maximum energy. This may be because, the closer the points are to the surface lines associated with a point, the higher the energy. However, the farther the points are from the surface lines associated with a point, the lower the energy. As such, the point that is associated with the maximum energy may be represent the separation point 130 between the driving surface 110 and the sidewalk 112. The vehicle 106 may then perform similar processes to determine the respective separation point 130 for each of the other spatial lines 122.

At operation 132, the process 100 may include generating a curve that represents a curb using the separation points. For instance, an example 134 illustrates the vehicle 106 generating a curve 136 that represents the curb 116. As will be descried in more detail with regard to FIG. 4, the vehicle 106 may initially generate the curve 136 to include straight lines connecting each of the spatial lines 122 along the lateral direction of the vehicle 106. The vehicle 106 may then perform additional processing in order to better fit the curve 136 to the curb 116. For example, the vehicle 106 may then analyze the curve 136 in order to identify at least one separation point 130 that includes an "outlier point" from the rest of the separation points 130. The vehicle 106 may then analyze the energies associated with separation points 130 that are proximate to the identified separation point 130. In some examples, the separation points 130 may be proximate to the identified separation point 130 based on the separation points 130 being within a threshold distance (e.g., 0.5 meters, 1 meter, 2 meters, etc.) to the identified separation point 130. The vehicle 106 may the use the energies to update the position of at least the identified separation point 130. The vehicle 106 may then continue to perform these processes in order to generate the curve 136.

As discussed above, the vehicle 106 may generate spatial lines 122 using points represented by sensor data. As such, FIG. 2 illustrates an example of generating the spatial lines 122 using points 202(1)-(5) (also referred to as "points 202"). In the example of FIG. 2, the vehicle 106 may generate the spatial lines 122 by quantizing the points 202 into distance bins 204(1)-(5) (also referred to as "distance bins 204") that are located laterally along the driving direction of the vehicle 106 (e.g., the x-direction). For example, each of the distance bins 204 may include a specific lateral distance along the driving direction. As described herein, the lateral distance may include, but is not limited to, ten centimeters, twenty centimeters, fifty centimeters, one hundred centimeters, and/or any other distance. The vehicle 106 may then quantize the points 202 into the distance bins 204 such that all of the points 202 that fall within a respective distance bin 204 are included in that distance bin 204.

For example, and as shown, all of the points 202(1) fall with the distance bin 204(1) and, as such, the vehicle 106 may include all of the points 202(1) within the distance bin 204(1). Additionally, all of the points 202(2) fall with the distance bin 204(2) and, as such, the vehicle 106 may include all of the points 202(2) within the distance bin 204(2). Furthermore, all of the points 202(3) fall with the distance bin 204(3) and, as such, the vehicle 106 may include all of the points 202(3) within the distance bin 204(3). Moreover, all of the points 202(4) fall with the distance bin 204(4) and, as such, the vehicle 106 may include all of the points 202(4) within the distance bin 204(4). Finally, all of the points 202(5) fall with the distance bin 204(5) and, as such, the vehicle 106 may include all of the points 202(5) within the distance bin 204(5).

In some examples, the vehicle 106 determines that the points 202 fall within the distance bins 204 using the locations (e.g., the coordinates) associated with the points 202. For example, the vehicle 106 may determine the lateral locations of the points 202 with respect to the vehicle 106, such as by using the x-coordinates associated with the points 202. Each distance bin 204 may then be associated with a respective lateral distance range. The vehicle 106 may thus determine that the points 202 fall within the distance bins 204 using the lateral locations of the points and the distance ranges. For example, if the distance bin 204(1) is associated with a lateral distance range that includes between 100 centimeters and 200 centimeters in front of the vehicle 106, then the vehicle 106 may determine that the points 202(1) that include lateral locations between 100 centimeters and 200 centimeters in front of the vehicle 106 are included within the distance bin 204(1). The vehicle may perform similar processes for each of the other distance bins 204(2)-(5).

The vehicle 106 may then generate a first spatial line 122 that includes the points 202(1) within the distance bin 204(1), a second spatial line 122 that includes the points 202(2) within the distance bin 204(2), a third spatial line 122 that includes the points 202(3) within the distance bin 204(3), a fourth spatial line 122 that includes the points 202(4) within the distance bin 204(4), and a fifth spatial line 122 that includes the points 202(5) within the distance bin 204(5).

After generating the spatial lines 122, and as also described above, the vehicle 106 may then determine the separation points 130 associated with the spatial lines 122. As such, FIG. 3 illustrates an example of determining a separation point 130 associated with a spatial line 122. As shown by the top illustration, the vehicle 106 may determine that points 302(1)-(10) (also referred to as "points 302") are associated with the spatial line 122. In the example of FIG. 3, the points 302(1)-(5) may be classified as the driving surface 110 and the points 302(6)-(10) may be classified as the sidewalk 112. Additionally, each of the points 302 may be associated with a respective location, such as x-coordinates, y-coordinates, and z-coordinates.

Next, and as illustrated by the middle illustration, the vehicle 106 may determine a potential separation point 304. In the example of FIG. 3, the potential separation point 304 is laterally alone the y-direction with respect to the vehicle 106. The vehicle 106 may assert that all of the points 302(1)-(5) on one side of the potential separation point 304 lay on a first surface line 306(1) (e.g., a surface line associated with the driving surface 110) and all of the points 302(6)-(10) on the other side of the potential separation point 304 lay on a second surface line 306(2) (e.g., a surface line associated with the sidewalk 112). The vehicle 106 may then determine an energy associated with the potential separation point 304, where the energy is based on the differences between the locations of the points 302 (e.g., in the z-direction) and the locations of the surface lines 306(1)-(2).

For example, and for the point 302(10), the vehicle 106 may determine a difference 308 between the second surface line 306(2) and the point 302(10). In some examples, the vehicle 106 determines the difference 308 as the distance between the point 302(10) and the second surface line 306(2), where the distance is determined using the location (e.g., the z-coordinate) associated with the point 302(10). In some examples, the vehicle 106 may also determine an additional difference (not illustrated for clarity reasons) between the first surface line 306(1) and the point 302(10). In such examples, the vehicle 106 determines the additional difference as the distance between the point 302(10) and the first surface line 306(1), where the additional distance is determined using the location (e.g., the z-coordinate) associated with the point 302(10). The vehicle 106 may then use the difference(s) to determine at least a first probability that the point 302(10) is associated with the second surface line 306(2) and/or a second probability that the point 302(10) is associated with the first surface line 306(1). In the example of FIG. 3, since the point 302(10) is closer to the second surface line 306(2) than the point 302(10) is to the first surface line 306(1), the vehicle 106 may determine that the first probability that the point 302(10) is associated with the second surface line 306(2) is greater than the second probability that the point 302(10) is associated with the first surface line 306(1).

The vehicle 106 may then perform similar processes to determine differences between the points 302(1)-(9) and the surface line(s) 306(1)-(2) and use the differences to determine probabilities associated with the points 302(1)-(9). Using the probabilities for the points 302(1)-(10), the vehicle 106 may determine an energy 310 associated with the potential separation point 304. In some examples, the lesser the differences between the points 302 and the surface lines 306(1)-(2), the greater the energy 310 associated with the potential separation point 304. Additionally, the greater the differences between the points 302 and the surface lines 306(1)-(2), the lesser the energy 310 associated with the potential separation point 304.

In some examples, the vehicle 106 may perform similar processes in order to determine energies 310 associated with other potential separation points 304 for the spatial line 122. The vehicle 106 may then use the energies 310 to determine the final separation point for the spatial line 122. For example, and as illustrated by the bottom illustration, the vehicle 106 may determine that the separation point 130 corresponds to the potential separation point 304 that is associated with the maximum energy 310. The vehicle 106 may make this determination since the potential separation point 304 that includes the maximum energy 310 may best represent the location of the curb 116. This may be because, and as described above, the potential separation point 304 that includes the maximum energy 310 will include the smallest differences between the points 302 and the surface lines 306(1)-(2). As such, the potential separation point 304 that includes the maximum energy 310 may best represent the separation between the driving surface 110 and the sidewalk 112.

Figure 3:
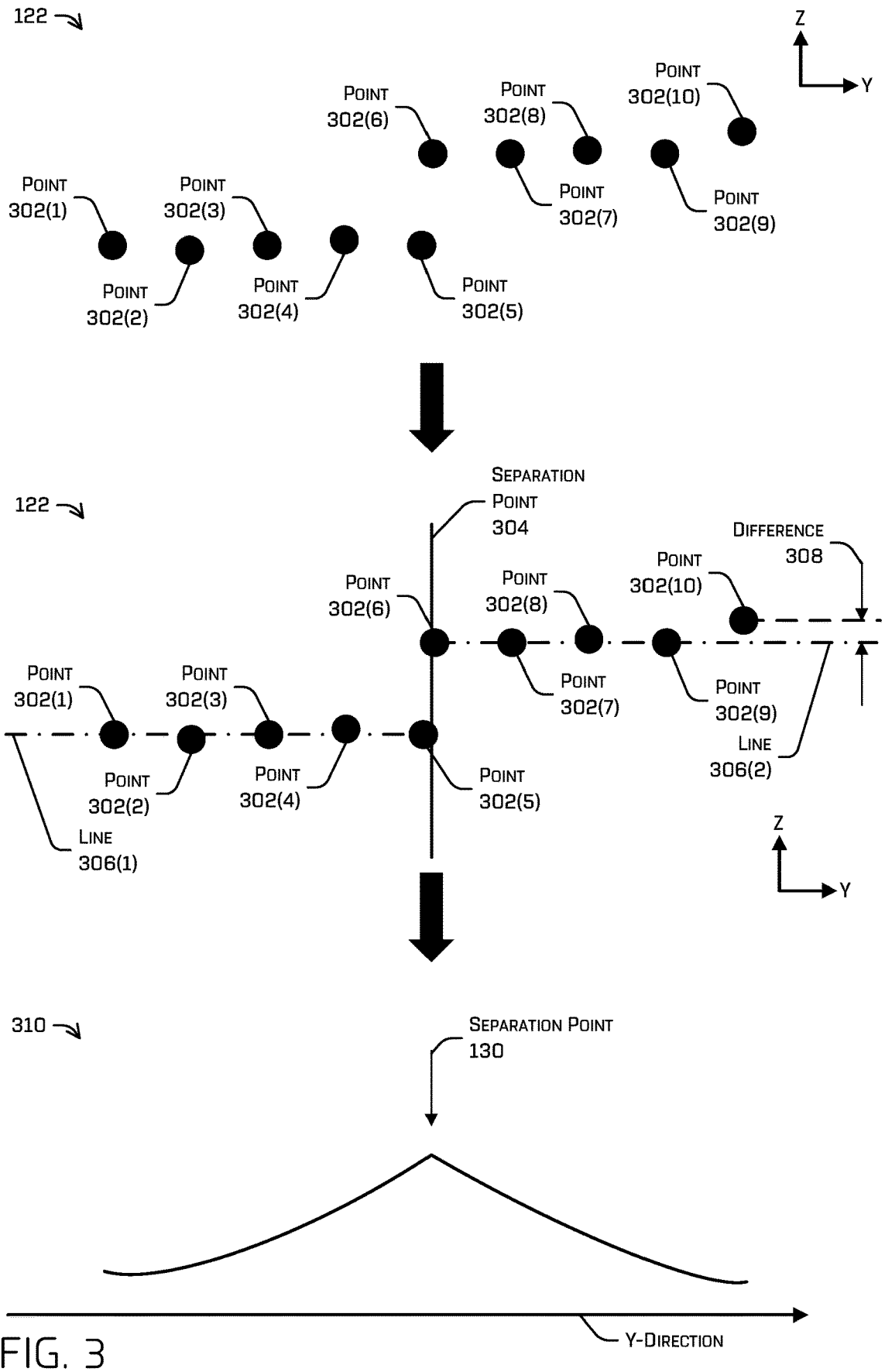
FIG. 3 illustrates an example of determining a separation point associated with a spatial line.

It should be noted that, although the example of FIG. 3 illustrates the surface lines 306(1)-(2) as including flat lines, in other examples, the surface lines 306(1)-(2) may include any other type of line. For examples, one or more of the surface lines 306(1)-(2) may be represented by a line that includes an angle (e.g., similar to an angle of a driving surface).

Figure 4:
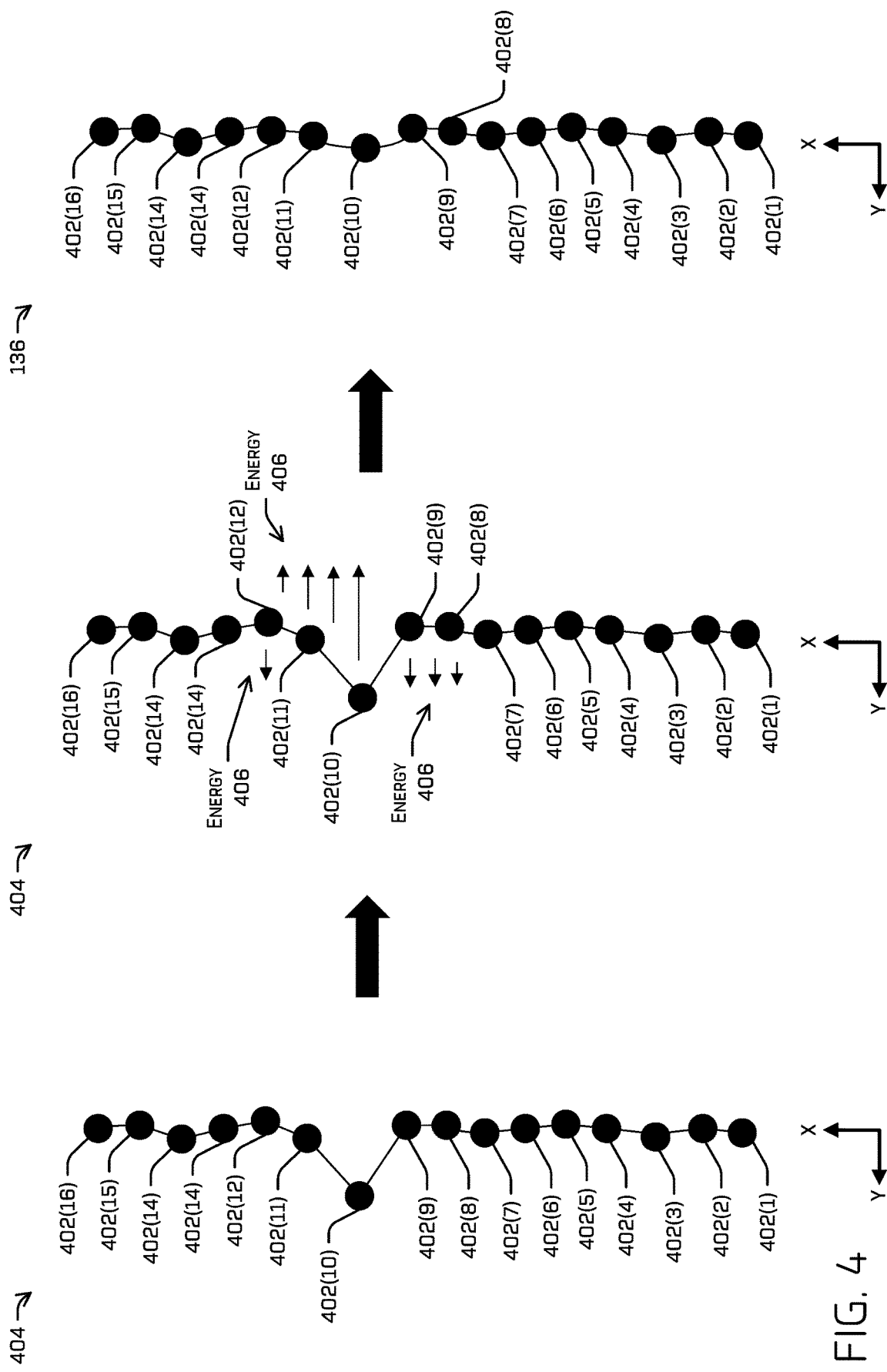
FIG. 4 illustrates an example of generating, using separation points, a curve that represents a curb.

After determining the separation points 130, and as also described above, the vehicle 106 may use the separation points 130 to generate the curve 136 that represents the curb 116. As such, FIG. 4 illustrates an example of generating, using separation points 402(1)-(6) (also referred to as "separation points 402") (which may represent, and/or include, the separation points 140), the curve 146 that represents the curb 116. For instance, and as illustrated by the left illustration, the vehicle 106 may initially generate a curve 404 by connecting each of the separation points 402 to one another. In some examples, the vehicle 106 initially generates the curve 404 by connecting the separation points 402 using straight lines. The vehicle 106 may then analyze the curve 404 in order to identify one or more of the points 402 that include "outlier points" for the curve 404.

For instance, and as shown by the left illustration, the vehicle 106 may determine that the separation point 402(10) includes an outlier point. Based on the determination, the vehicle 106 may adjust the position of at least the separation point 402(10). For example, the vehicle 106 may identify additional separation points 402 that are located proximate to the separation point 402(10). In some examples, the vehicle 106 identifies the additional separation points 402 as being within a threshold number of points (e.g., one point, two points, five points, etc.) to the separation point 402(10). For example, the vehicle 106 may identify additional separation points 402(8)-(9) that are within two points before the separation point 402(10) and additional separation points 402(11)-(12) that are within two points after the separation point 402(10). Additionally, or alternatively, in some examples, the vehicle 106 identifies the additional separation points 402 as being within a threshold distance to the separation point 402(10). For example, the vehicle 106 may identify additional separation points 402(8)-(9) that are within fifty centimeters before the separation point 402(10) and additional separation points 402(11)-(12) that are within fifty centimeters after the separation point 402(10).

Next, and as shown by the middle illustration, the vehicle 106 may then determine energies 406 associated with the separation points 402(8)-(12) and/or the lines that connect the separation points 402(8)-(12). In some examples, the vehicle 106 then computes the gradient on the energy direction to determine a new position for at least the separation point 402(10). For example, and as shown by the right illustration, the vehicle 106 moves the separation point 402(10) towards the direction of the energy 406. Additionally, in the example of FIG. 4, the vehicle 106 also moved the additional separation points that are proximate to the separation point 402(10). In some examples, the vehicle 106 may continue to perform these processes in order to generate the curve 146 that represents the curb 116.

Figure 5:
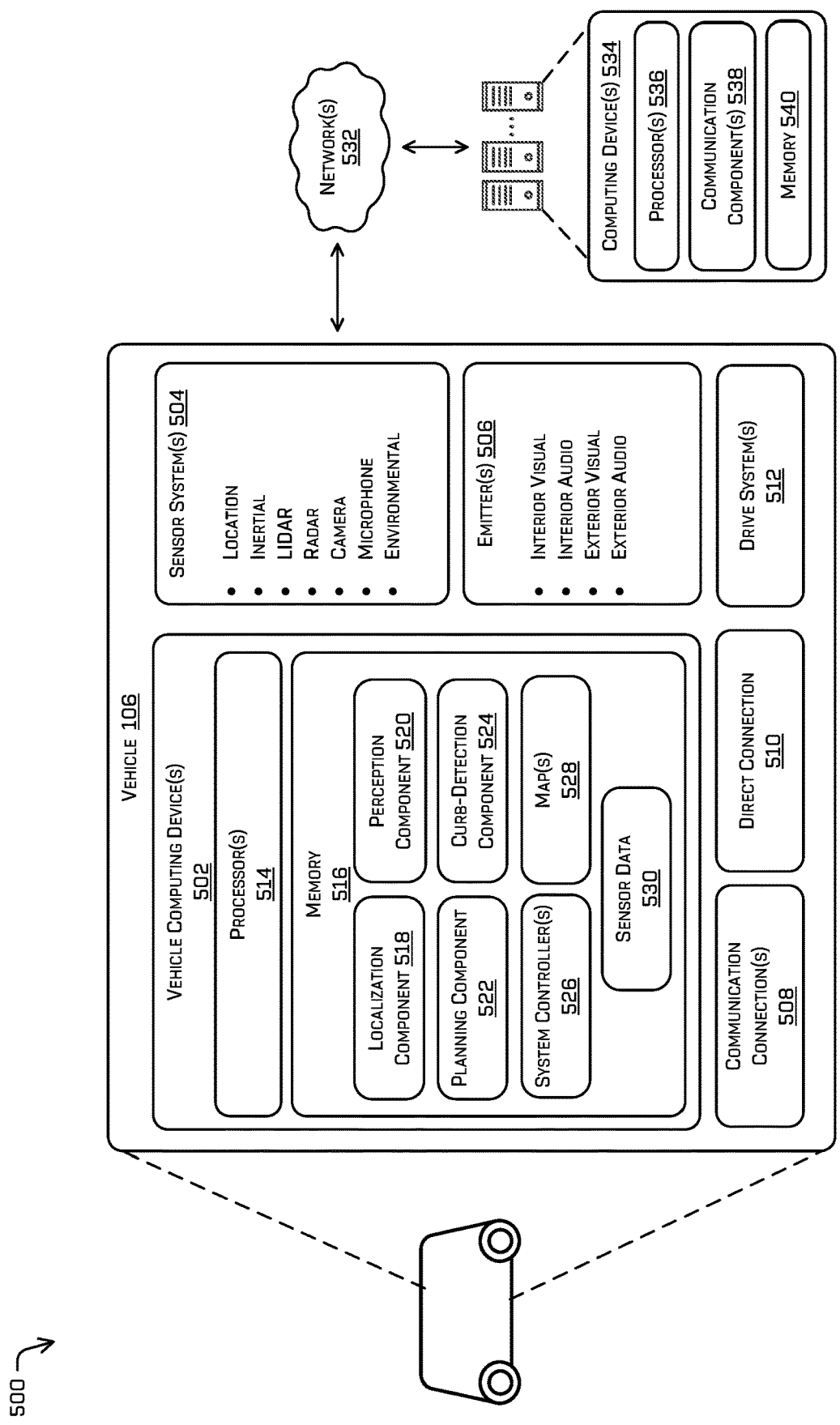
FIG. 5 depicts a block diagram of an example system for implementing the techniques described herein.

FIG. 5 depicts a block diagram of an example system 500 for implementing the techniques described herein, in accordance with embodiments of the disclosure. In at least one example, the system 500 can include the vehicle 106. The vehicle 106 can include a vehicle computing device 502, one or more sensor systems 504, one or more emitters 506, one or more communication connections 508, at least one direct connection 510, and one or more drive systems 512.

The vehicle computing device 502 can include one or more processors 514 and a memory 516 communicatively coupled with the processor(s) 514. In the illustrated example, the vehicle 106 is an autonomous vehicle. However, the vehicle 106 may be any other type of vehicle (e.g., a manually driven vehicle, a semi-autonomous vehicle, etc.), or any other system having at least an image capture device. In the illustrated example, the memory 516 of the vehicle computing device 502 stores a localization component 518, a perception component 520, a planning component 522, a curb-determination component 524, one or more system controllers 526, and one or more maps 528. Though depicted in FIG. 5 as residing in the memory 516 for illustrative purposes, it is contemplated that the localization component 518, the perception component 520, the planning component 522, the curb-determination component 524, the system controller(s) 526, and/or the map(s) 528 can additionally, or alternatively, be accessible to the vehicle 106 (e.g., stored on, or otherwise accessible by, memory remote from the vehicle 106).

In at least one example, the localization component 518 can include functionality to receive sensor data 530 from the sensor system(s) 504 and to determine a position and/or orientation of the vehicle 106 (e.g., one or more of an x-, y-, z-position, roll, pitch, or yaw). For example, the localization component 518 can include and/or request/receive a map of an environment and can continuously determine a location and/or orientation of the vehicle 106 within the map. In some instances, the localization component 518 can utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the vehicle 106. In some instances, the localization component 518 can provide data to various components of the vehicle 106 to determine an initial position of the vehicle 106 for generating a candidate trajectory, as discussed herein.

In some instances, the perception component 520 can include functionality to perform object detection, segmentation, and/or classification. In some instances, the perception component 520 can provide processed sensor data 530 that indicates a presence of an object that is proximate to the vehicle 106 and/or a classification of the object as an object type (e.g., car, pedestrian, cyclist, animal, building, tree, road surface, curb, sidewalk, unknown, etc.). In additional and/or alternative examples, the perception component 520 can provide processed sensor data 530 that indicates one or more characteristics associated with a detected object and/or the environment in which the object is positioned. In some instances, characteristics associated with an object can include, but are not limited to, an x-position (global position), a y-position (global position), a z-position (global position), an orientation (e.g., a roll, pitch, yaw), an object type (e.g., a classification), a velocity of the object, an acceleration of the object, an extent of the object (size), etc. Characteristics associated with the environment can include, but are not limited to, a presence of another object in the environment, a state of another object in the environment, a time of day, a day of a week, a season, a weather condition, an indication of darkness/light, etc.

In general, the planning component 522 can determine a path for the vehicle 106 to follow to traverse through an environment. For example, the planning component 522 can determine various routes and trajectories and various levels of detail. For example, the planning component 522 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 522 can generate an instruction for guiding the vehicle 106 along at least a portion of the route from the first location to the second location. In at least one example, the planning component 522 can determine how to guide the vehicle 106 from a first waypoint in the sequence of waypoints to a second waypoint in the sequence of waypoints. In some instances, the instruction can be a trajectory, or a portion of a trajectory. In some instances, multiple trajectories can be substantially simultaneously generated (e.g., within technical tolerances) in accordance with a receding horizon technique, wherein one of the multiple trajectories is selected for the vehicle 106 to navigate.

In at least one example, the planning component 522 can determine a pickup location associated with a location. As used herein, a pickup location can be a specific location (e.g., a parking space, a loading zone, a portion of a ground surface, etc.) within a threshold distance of a location (e.g., an address or location associated with a dispatch request) where the vehicle 106 can stop to pick up a passenger. In at least one example, the planning component 522 can determine a pickup location based at least in part on determining a user identity (e.g., determined via image recognition or received as an indication from a user device, as discussed herein). Arrival at a pickup location, arrival at a destination location, entry of the vehicle by a passenger, and receipt of a "start ride" command are additional examples of events that may be used for event-based data logging.

The curb-detection component 524 may be configured to perform the processes described herein in order to determine the locations of curbs within an environment. For example, the curb-detection component 524 may be configured to analyze the sensor data 530 in order to identify points, represented by the sensor data, for identifying a curb. As described herein, the points may be classified as belonging to at least driving surface(s) and sidewalk(s). The curb-detection component 524 may then be configured to generate the spatial lines using the points. After generating the spatial lines, the curb-detection component 524 may be configured to analyze the spatial lines in order to determine the separation points associated with the spatial lines.

The curb-detection component 524 may then be configured to generate, using the spatial lines, the curve that represents the curb. In some examples, the curb-detection component 524 may be configured to continue these processes in order to continue determining locations of curbs. Additionally, in some examples, the curb-detection component 524 may be configured to perform the processes described herein to identify curbs that are located on more than one side of the vehicle 106. For example, the curb-detection component 524 may be configured to determine the locations of curbs that are located on both a first side (e.g., a driver side) of the vehicle 106 and curbs that are located on a second side (e.g., a passenger side) of the vehicle 106.

In at least one example, the vehicle computing device 502 can include the system controller(s) 526, which can be configured to control steering, propulsion, braking, safety, emitters, communication, and other systems of the vehicle 106. These system controller(s) 526 can communicate with and/or control corresponding systems of the drive system(s) 512 and/or other components of the vehicle 106.

The memory 516 can further include the map(s) 528 that can be used by the vehicle 106 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment and can be loaded into working memory as needed. In at least one example, the map(s) 528 can include at least one map (e.g., images and/or a mesh). In some example, the vehicle 106 can be controlled based at least in part on the map(s) 528. That is, the map(s) 528 can be used in connection with the localization component 518, the perception component 520, and/or the planning component 522 to determine a location of the vehicle 106, identify entities in an environment, and/or generate routes and/or trajectories to navigate within an environment.

In some instances, aspects of some or all of the components discussed herein can include any models, algorithms, and/or machine learning algorithms. For example, in some instances, the components in the memory 516 can be implemented as a neural network. As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based at least in part on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

As discussed above, in at least one example, the sensor system(s) 504 can include lidar sensors, radar sensors, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 504 can include multiple instances of each of these or other types of sensors. For instance, the lidar sensors can include individual lidar sensors located at the corners, front, back, sides, and/or top of the vehicle 106. As another example, the camera sensors can include multiple cameras disposed at various locations about the exterior and/or interior of the vehicle 106. The sensor system(s) 504 can provide input to the vehicle computing device 502. Additionally or alternatively, the sensor system(s) 504 can send the sensor data 530, via the one or more network(s) 532, to a computing device(s) 534 at a particular frequency, after a lapse of a predetermined period of time, upon occurrence of one or more conditions, in near real-time, etc.

The vehicle 106 can also include the emitter(s) 506 for emitting light and/or sound, as described above. The emitter(s) 506 in this example include interior audio and visual emitters to communicate with passengers of the vehicle 106. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 506 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 106 can also include the communication connections(s) 508 that enable communication between the vehicle 106 and one or more other local or remote computing device(s). For instance, the communication connection(s) 508 can facilitate communication with other local computing device(s) on the vehicle 106 and/or the drive system(s) 512. Also, the communication connection(s) 508 can allow the vehicle 106 to communicate with other nearby computing device(s) (e.g., other nearby vehicles, traffic signals, etc.). The communications connection(s) 508 also enable the vehicle 106 to communicate with the remote teleoperations computing devices or other remote services.

The communications connection(s) 508 can include physical and/or logical interfaces for connecting the vehicle computing device 502 to another computing device or a network, such as network(s) 532. For example, the communications connection(s) 508 can enable Wi-Fi-based communication such as via frequencies defined by the IEEE 802.11 standards, short range wireless frequencies such as Bluetooth®, cellular communication (e.g., 2G, 2G, 4G, 4G LTE, 5G, etc.) or any suitable wired or wireless communications protocol that enables the respective computing device to interface with the other computing device(s).

In at least one example, the vehicle 106 can include one or more drive systems 512. In some instances, the vehicle 106 can have a single drive system 512. In at least one example, if the vehicle 106 has multiple drive systems 512, individual drive systems 512 can be positioned on opposite ends of the vehicle 106 (e.g., the front and the rear, etc.). In at least one example, the drive system(s) 512 can include one or more sensor systems to detect conditions of the drive system(s) 512 and/or the surroundings of the vehicle 106. By way of example and not limitation, the sensor system(s) 504 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system(s), cameras or other image sensors, ultrasonic sensors to acoustically detect entities in the surroundings of the drive system(s), lidar sensors, radar sensors, etc. Some sensors, such as the wheel encoders can be unique to the drive system(s) 512. In some cases, the sensor system(s) 504 on the drive system(s) 512 can overlap or supplement corresponding systems of the vehicle 106 (e.g., sensor system(s) 504).

The drive system(s) 512 can include many of the vehicle systems, including a high voltage battery, a motor to propel the vehicle 106, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 512 can include a drive system controller which can receive and preprocess the sensor data 530 from the sensor system(s) 504 and to control operation of the various vehicle systems. In some instances, the drive system controller can include one or more processors and memory communicatively coupled with the one or more processors. The memory can store instructions to perform various functionalities of the drive system(s) 512. Furthermore, the drive system(s) 512 also include one or more communication connection(s) that enable communication by the respective drive system with one or more other local or remote computing device(s).

In at least one example, the direct connection 510 can provide a physical interface to couple the one or more drive system(s) 512 with the body of the vehicle 106. For example, the direct connection 510 can allow the transfer of energy, fluids, air, data, etc. between the drive system(s) 512 and the vehicle 106. In some instances, the direct connection 510 can further releasably secure the drive system(s) 512 to the body of the vehicle 106.

As further illustrated in FIG. 5, the computing device(s) 534 can include processor(s) 536, communication connection(s) 538, and memory 540. The processor(s) 514 of the vehicle 106 and/or the processor(s) 536 of the computing device(s) 534 (and/or other processor(s) described herein) can be any suitable processor capable of executing instructions to process data and perform operations as described herein. By way of example and not limitation, the processor(s) 514 and the processor(s) 536 can comprise one or more Central Processing Units (CPUs), Graphics Processing Units (GPUs), or any other device or portion of a device that processes electronic data to transform that electronic data into other electronic data that can be stored in registers and/or memory. In some instances, integrated circuits (e.g., ASICs, etc.), gate arrays (e.g., FPGAs, etc.), and other hardware devices can also be considered processors in so far as they are configured to implement encoded instructions.

The memory 516 and the memory 540 (and/or other memory described herein) are examples of non-transitory computer-readable media. The memory 516 and the memory 540 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 5 is illustrated as a distributed system, in alternative examples, components of the computing device(s) 534 can be associated with the vehicle 106. That is, the vehicle 106 can perform one or more of the functions associated with the computing device(s) 534 and/or the computing device(s) 534 can perform one or more of the functions associated with the vehicle 106. For example, the computing device(s) 534 may store the curb-detection component 524, receive the sensor data 530 from the vehicle 106, and then use the curb-detection component 524 to generate the curve that represents the curb, using similar processes as those described above with regard to the vehicle 106.

Figure 6:
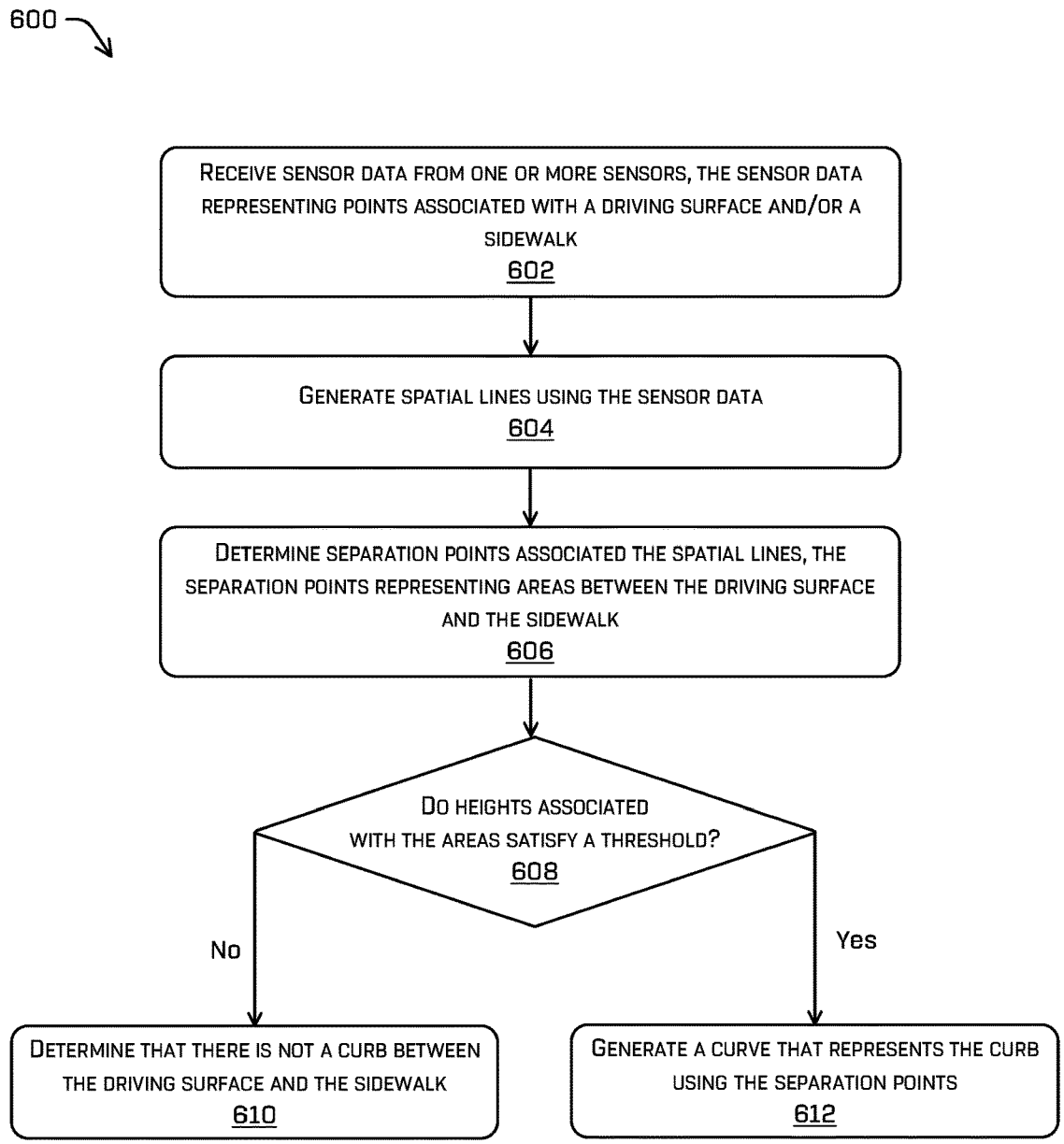
FIG. 6 illustrates a flow diagram of an example process for generating a curve that represents a curb.
Figure 7:
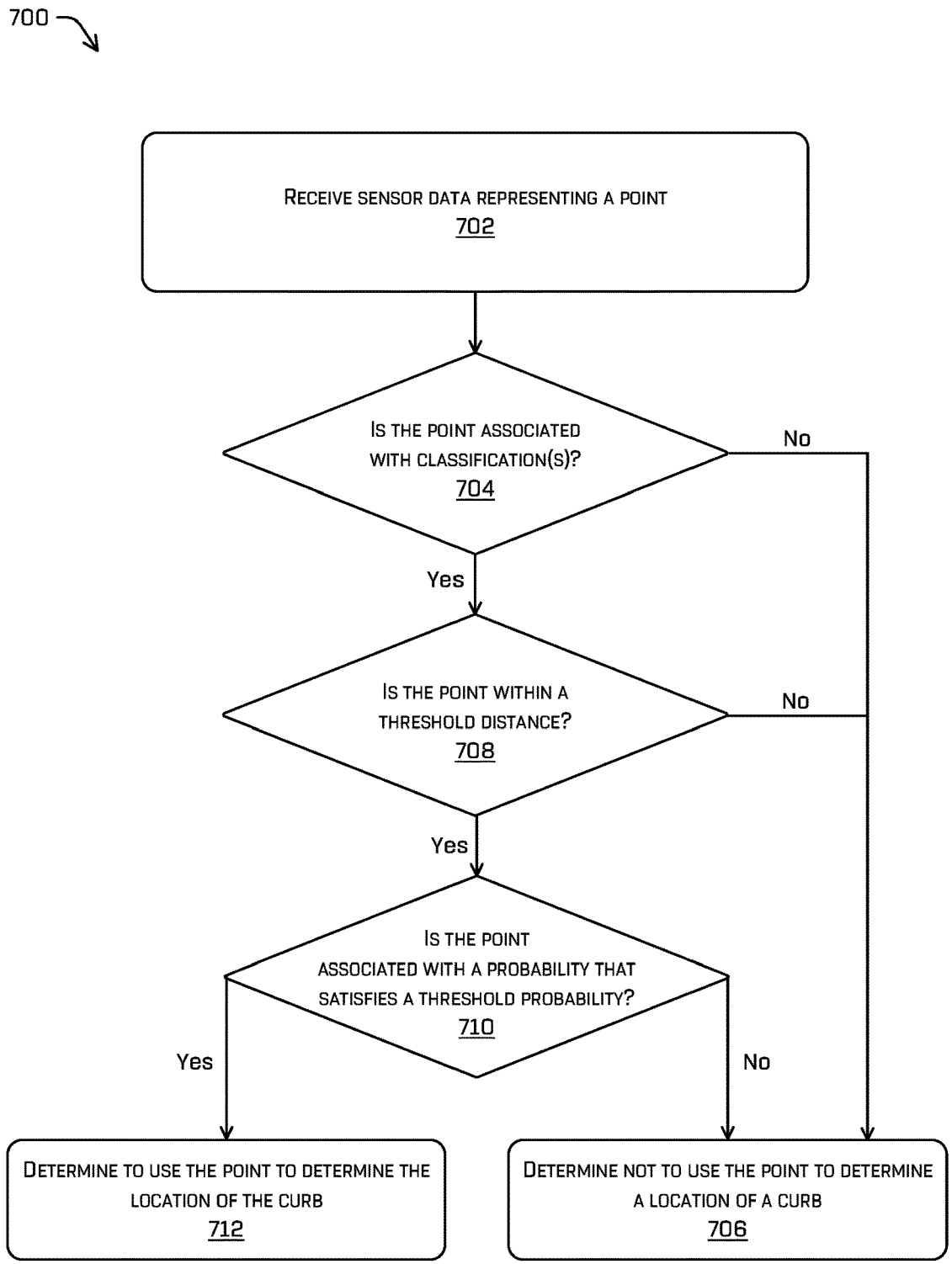
FIG. 7 illustrates a flow diagram of an example process for identifying at least a reliable point for use in identifying a location of a curb.
Figure 8:
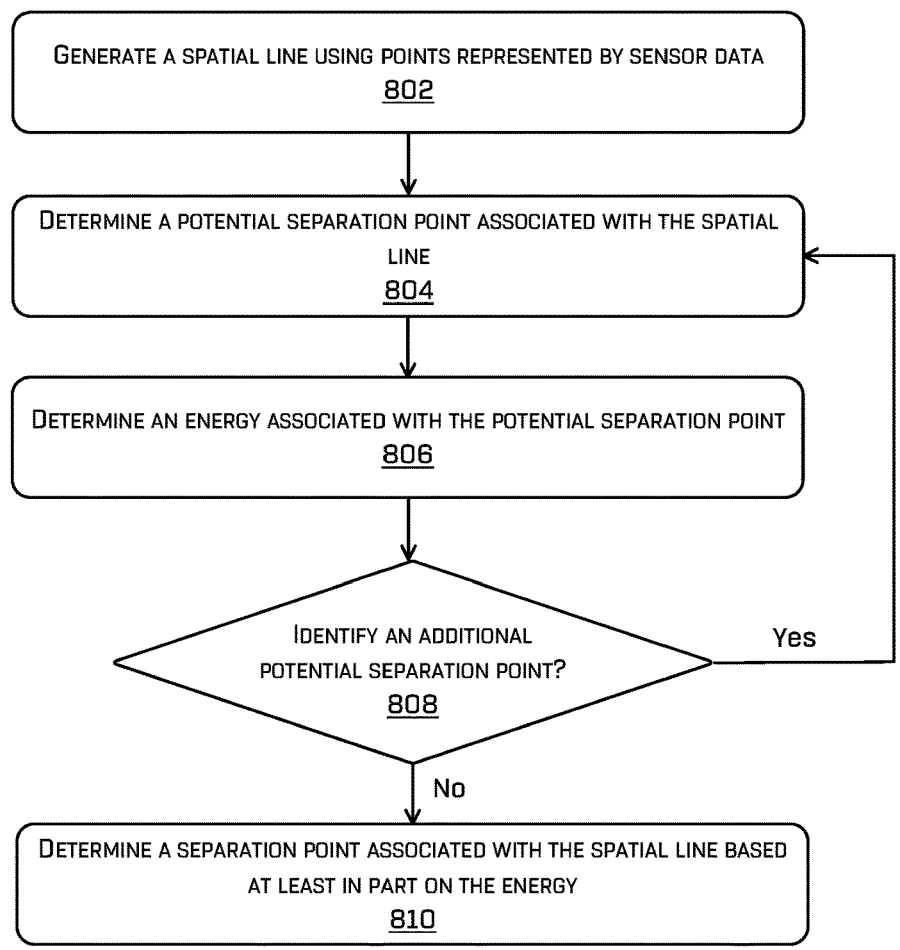
FIG. 8 illustrates a flow diagram of an example process for determining a separation point associated with a spatial line.

FIGS. 6-8 illustrate example processes in accordance with the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be omitted or combined in any order and/or in parallel to implement the processes.

FIG. 6 illustrates a flow diagram of an example process 600 for generating a curve that represents a curb. At operation 602, the process 600 may include receiving sensor data from one or more sensors, the sensor data representing a driving surface and/or a sidewalk. For instance, the vehicle 106 may receive the sensor data from the one or more sensors, such as one or more lidar sensors. As described herein, the sensor data may represent locations of points within an environment and/or probabilities associated with accuracies associated with the points. In some examples, the vehicle 106 may then analyze the sensor data, such as by using one or more models, in order to determine classifications associated with the points. In some examples, the vehicle 106 may then filter the points using one or more processes. For example, the vehicle 106 may filter the points to identify points that are associated with the driving surface and/or the sidewalk, identify points that are located within a threshold distance to the vehicle 106, and/or identify points that are associated with probabilities that satisfy a threshold probability.

At operation 604, the process 600 may include generating spatial lines using the sensor data. For instance, the vehicle 106 may use the points (e.g., the filtered points) in order to generate the spatial lines. As described herein, to generate the spatial lines, the vehicle 106 may quantize the points into distance bins that are located laterally along the driving direction of the vehicle 106. For example, each of the distance bins may include a specific lateral distance along the driving direction. As described herein, the lateral distance may include, but is not limited to, ten centimeters, twenty centimeters, fifty centimeters, one hundred centimeters, and/or any other distance. The vehicle 106 may then quantize the points into the distance bins such that all of the points that fall within a respective distance bin are included in that distance bin. These distance bins may then represent the spatial lines that the vehicle 106 uses for identifying the locations of the curb.

At operation 606, the process 600 may include determining separation points associated with the spatial lines, the separation points representing areas between the driving surface and the sidewalk. For instance, the vehicle 106 may determine the separation points associated with the spatial lines. As described herein, for each spatial line, the vehicle 106 may identify the separation point that separates the points that are associated with the driving surface from the points that are associated with the sidewalk. In some examples, to identify the separation point, the vehicle 106 may analyze various points along the spatial line, such as laterally in the y-direction. For each point along the spatial line, the vehicle 106 may perform the processes described herein to determine a respective energy. The vehicle 106 may then determine that the separation point for the spatial line includes the point along the spatial line with the maximum energy. Additionally, the vehicle 106 may perform similar processes to determine the separation points for each of the other spatial lines.

At operation 608, the process 600 may include determining whether the heights associated with the areas satisfies a threshold height. For instance, the vehicle 106 may determine the heights associated with the areas. In some examples, the vehicle 106 may determine the heights by taking differences between the points that are associated with the driving surface and the points that are associated with the sidewalk. For example, and to determine a height, the vehicle 106 may determine the difference between a first coordinate (e.g., a z-coordinate) for a first point that is associated with the driving surface and a second coordinate (e.g., a z-coordinate) for a second point that is associated with the sidewalk. The vehicle 106 may then determine whether the heights satisfy (e.g., area equal to or greater than) the threshold height.

If, at operation 608, it is determined that the heights do not satisfy the threshold height, then at operation 610, the process 600 may include determining that there is not a curb between the driving surface and the sidewalk. For instance, if the vehicle 106 determines that the heights do not satisfy the threshold height, then the vehicle 106 may determine that there is no curb.

However, if, at operation 608, it is determined that the heights satisfy the threshold height, then at operation 612, the process 600 may include generating a curve that represents the curb using the separation points. For instance, if the vehicle 106 determines that the heights satisfy the threshold height, then the vehicle 106 may generate the curve that represents the curb. Additionally, the vehicle 106 may use the curve to perform one or more actions. For example, the vehicle 106 may use the curve to avoid the curb and/or to stop at a location that is proximate to the curb.

FIG. 7 illustrates a flow diagram of an example process 700 for identifying at least a reliable point for use in identifying a location of a curb. At operation 702, the process 700 may include receiving sensor data representing a point. For instance, the vehicle 106 may receive the sensor data from the one or more sensors, such as one or more lidar sensors. As described herein, the sensor data may represent locations of points within an environment and/or probabilities associated with accuracies associated with the points. In some examples, the vehicle 106 may then analyze the sensor data, such as by using one or more models, in order to determine classifications associated with the points.

At operation 704, the process 700 may include determining whether the point is associated with classification(s). For instance, the vehicle 106 may determine whether the point is associated with specific classification(s). As described herein, in some examples, the specific classification(s) may include driving surface(s) and/or sidewalks(s). If, at operation 704, it is determined that the point is not associated with the classification(s), then at operation 706, the process 700 may include determining not to use the point to determine a location of a curb. For instance, if the vehicle 106 determines that the point is not associated with the classification(s), then the vehicle 106 may determine not to use the point to determine the location of the curb.

However, if, at operation 704, it is determined that the point is associated with the classification(s), then at operation 708, the process 700 may include determining whether the point is within a threshold distance. For instance, if the vehicle 106 determines that the point is associated with the classification(s), then the vehicle 106 may determine whether the point is within the threshold distance to the vehicle 106. In some examples, the vehicle 106 may make the determination using the location of the point with respect to the vehicle 106. If, at operation 708, it is determined that the point is within the threshold distance, then again at operation 706, the process 700 may include determining not to use the point to determine the location of the curb. For instance, if the vehicle 106 determines that the point is not within the threshold distance, then the vehicle 106 may determine not to use the point to determine the location of the curb.

However, if, at operation 708, it is determined that the point is within the threshold distance, then at operation 710, the process 700 may include determining whether the point is associated with a probability that satisfies a threshold probability. For instance, if the vehicle 106 determines that the point is within the threshold distance, then the vehicle 106 may determine whether the point is associated with the probability that satisfies the threshold probability. If, at operation 710, it is determined that the probability does not satisfy the threshold probability, then again at operation 706, the process 700 may include determining not to use the point to determine the location of the curb. For instance, if the vehicle 106 determines that the probability does not satisfy the threshold probability, then the vehicle 106 may determine not to use the point to determine the location of the curb.

However, if, at operation 710, it is determined that the point is associated with the probability that satisfies the threshold probability, then at operation 712, the process 700 may include determining to use the point to determine the location of the curb. For instance, if the vehicle 106 determines that the probability satisfies the threshold probability, then the vehicle 106 may determine to use the point to determine the location of the curb. Additionally, the vehicle 106 may continue to perform the example process 700 in order to identify additional points that the vehicle 106 may use determine the location of the curb.

While the process 700 of FIG. 7 illustrates an order for operations 704, 708, and 710, in other examples, the process 700 may include any other order for operations 704, 708, and 710. Additionally, in some examples, the process 700 may not include one more of the operations 704, 708, or 710.

FIG. 8 illustrates a flow diagram of an example process 800 for determining a separation point associated with a spatial line. At operation 802, the process 800 may include generating a spatial line using points represented by sensor data. For instance, the vehicle 106 may generate the spatial line using the points. As described herein, the spatial line may be associated with a distance bin, where the locations of the points are within the distance bin. In some examples, the vehicle 106 initially processes the points before generating the spatial line, such as by performing the process 700 of FIG. 7. For example, the vehicle 106 may determine that the points are associated with specific classification(s), determine that the points are within a threshold distance to the vehicle 106, and/or determine that probabilities associated with the points satisfy a threshold probability.

At operation 804, the process 800 may include determining a potential separation point associated with the spatial line. For instance, the vehicle 106 may determine the potential separation point associated with the spatial line. In some examples, the vehicle 106 determines the potential separation point by moving across the spatial line along a specific direction, such as the y-direction.

At operation 806, the process 800 may include determining an energy associated with the potential separation point. For instance, the vehicle 106 may analyze the potential separation point in order to determine the energy. In some examples, to determine the energy, the vehicle 106 initially asserts that all of the points on one side of the potential separation point lay on a first surface line (e.g., a surface line associated with the driving surface(s)) and all points on the other side of the potential separation point lay on a second surface line (e.g., a surface line associated with the sidewalk(s)). The vehicle 106 may then determine differences between the locations of the points (e.g., in the z-direction) and the locations of the surface lines. Using the differences, the vehicle 106 may determine the energy.

At operation 808, the process 800 may include determining whether to identify an additional potential separation point. For instance, the vehicle 106 may determine whether to identify the additional potential separation point for the spatial line. In some examples, the vehicle 106 may determine a threshold number of potential separation points for the spatial line. In such examples, the threshold number of potential separation points may be based on the length of the spatial line. In some examples, the vehicle 106 may determine to identify the additional potential separation point based on the energy of the potential separation point. For instance, the vehicle 106 may determine to identify the additional potential separation point when the energy is equal to or greater than a threshold energy.

If, at operation 808, it is determined to identify the additional potential separation point, then the process 800 may repeat back at operation 804. For instance, if the vehicle 106 determines to identify the additional potential separation point, then the vehicle 106 may determine the additional potential separation point for the spatial line. For instance, the vehicle 106 may determine the additional potential separation point by moving in the y-direction along the spatial line.

However, if at operation 808, it is determined not to identify the additional potential separation point, then at operation 810, the process 800 may include determining a separation point associated with the spatial line based at least in part on the energy. For instance, if the vehicle 106 determines not to identify the additional potential separation point, then the vehicle 106 may determine the separation point based at least in part on the energy. As described herein, the vehicle 106 may determine the separation point to include the potential separation point that is associated with the minimum energy. This is because the potential separation point that is associated with the minimum energy may be located at a location that is associated with the curb within the environment.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

EXAMPLE CLAUSES

A: A system comprising: one or more processors; and one or more computer-readable media storing instructions that, when executed by the one or more processors, cause the one or more processors to perform operations comprising: receiving sensor data from a lidar sensor, the sensor data representing first points associated with a drivable surface and second points associated with a sidewalk; generating spatial lines using the first points associated with the drivable surface and the second points associated with the sidewalk; determining, for the spatial lines, separation points between the first points associated with the drivable surface and the second points associated with the sidewalk; generating, based at least in part on the separation points, a curve that represents a curb between the drivable surface and the sidewalk; and controlling a vehicle based at least in part on the curve.

B: The system as recited in paragraph A, wherein receiving the sensor data occurs at a first time, and wherein the operations further comprise: receiving, at a second time, additional sensor data from the lidar sensor, the additional sensor data representing third points associated with the drivable surface and fourth points associated with the sidewalk, and wherein generating the spatial lines further uses the third points and the fourth points.

C: The vehicle as recited in either paragraph A or paragraph B, the operations further comprising: determining, for a spatial line from the spatial lines, a distance between a first point associated with the drivable surface and a second point associated with the sidewalk; determining that the distance is equal to or greater than a threshold distance; and determining that a separation point associated with the spatial line is associated with the curb based at least in part on the distance being equal to or greater than the threshold distance.

D: The vehicle as recited in any one of paragraphs A-C, wherein determining a separation point from the separation points comprises at least: determining, based at least in part a candidate separation point, a first surface line associated with a first portion of the sensor data and a second surface line associated with a second portion of the sensor data; determining, based at least in part on a first difference between the first surface line and a first point of the first portion of the sensor data, a first energy; determining, based at least in part on a second difference between the second surface line an second point of the second portion of the sensor data, a second energy; and determining that the candidate separation point is a separation point based at least in part on the first energy and the second energy.

E: The vehicle as recited in any one of paragraphs A-D, wherein generating a spatial line from the spatial lines comprises at least: analyzing the sensor data to identify at least a portion of the first points that are located within a distance range from the vehicle; analyzing the sensor data to identify at least a portion of the second points that are located within the distance range; and generating the spatial line to include at least the portion of the first points and the portion of the second points.

F: A method comprising: receiving sensor data from a sensor associated with a vehicle, the sensor data representing a first point associated with a drivable surface and a second point associated with a non-drivable surface at a different height than the drivable surface; determining, based on the sensor data, a first surface line representing the drivable surface and a second surface line representing the non-drivable surface; determining, based on the first surface line and the second surface line, a separation point between the first surface line and the second surface line; and controlling the vehicle based at least in part on the separation point.

G: The method as recited in paragraph F, wherein: the first surface line and the second surface line are determined based at least in part on the first point and the second point; the sensor data further represents a third point associated with the drivable surface and a fourth point associated with the non-drivable surface; the method further comprises: determining, based on the third point and the fourth point, a third surface line representing the drivable surface and a fourth surface line representing the non-drivable surface; and determining, based on the third surface line and the fourth surface line, an additional separation point between the third surface line and the fourth surface line; and controlling the vehicle is further based at least in part on the additional separation point.

H: The method as recited in either paragraph F or paragraph G, further comprising: generating a spatial line using the first point and the second point, wherein determining the first surface line and the second surface line are based at least in part on the spatial line.

I: The method as recited in paragraph H, further comprising: determining that the first point is located within a distance range from the vehicle; and determining that the second point is located within the distance range, and wherein generating the spatial line using the first point and the second point is based at least in part on the first point being located within the distance range and the second point being located within the distance range.

J: The method as recited in any one of paragraphs F-I, wherein receiving the sensor data occurs at a first time, and wherein the method further comprises: receiving, at a second time, additional sensor data from the sensor, the additional sensor data representing at least a third point associated with the drivable surface and a fourth point associated with the non-drivable surface, and wherein determining the first surface line and the second surface line is further based at least in part on the additional sensor data.

K: The method as recited in any one of paragraphs F-J, further comprising: determining a distance between the first point associated with the drivable surface and the second point associated with the non-drivable surface; determining that the distance is equal to or greater than a threshold distance; and determining that the separation point is associated with a curb based at least in part on the distance being equal to or greater than the threshold distance.

L: The method as recited in any one of paragraphs F-K, further comprising: determining a first probability associated with the first point; determining that the first probability is equal to or greater than a threshold probability; determining a second probability associated with the second point; and determining that the second probability is equal to or greater than the threshold probability, and wherein determining the first surface line and the second surface line uses at least the first point and the second point based at least in part on the first probability being equal to or greater than the threshold probability and the second probability being equal to or greater than the threshold probability.

M: The method as recited in any one of paragraphs F-L, further comprising: determining that the first point is associated with the driving surface; and determining that the second point is associated with the non-drivable surface, and wherein determining the first surface line and the second surface line uses at least the first point and the second point based at least in part on the first point being associated with the driving surface and the second point being associated with the non-drivable surface.

N: The method as recited in any one of paragraphs F-M further comprising: determining that the first point is located within a threshold distance to the vehicle; and determining that the second point is located within the threshold distance, and wherein determining the first surface line and the second surface line uses at least the first point and the second point based at least in part on the first point being located within the threshold distance and the second point being located within the threshold distance.

O: The method as recited in any one of paragraphs F-N, wherein determining the separation point comprises at least: determining a first difference between a first location associated with the first point the first surface line; determining a second difference between a second location associated with the second point and the second surface line; determining an energy based at least in part on the first difference and the second difference; and determining the separation point based at least in part on the energy.

P: The method as recited in any one of paragraphs F-O, further comprising: determining, based at least in part on the sensor data, a third surface line representing the drivable surface and a fourth surface line representing the non-drivable surface; determining, based on the third surface line and the fourth surface line, an additional separation point between the third surface line and the fourth surface line; and generating, based at least in part on the separation point and the additional separation point, a curve that represents a curb, wherein controlling the vehicle is based at least in part on the curve.

Q: The method as recited in any one of paragraph F-P, further comprising: generating an additional curve based at least in part on the separation point and the additional separation point; determining a first position associated with the separation point on the additional curve; determining an energy based at least in part on the first position associated with the separation point and a second position associated with the additional separation point; determining a third position for the separation point based at least in part on the energy; and generating the curve based at least in part on the third position.

R: The method as recited in any one of paragraphs F-Q, further comprising: determining a first coordinate associated with the first point; determining a second coordinate associated with the second point; and determining a height of the curb based at least in part on the first coordinate and the second coordinate.

S: One or more non-transitory computer-readable media storing instructions that, when executed by one or more processors, cause the one or more processors to perform operations comprising: receiving sensor data from a sensor associated with a vehicle, the sensor data representing a first point associated with a drivable surface and a second point associated with a non-drivable surface at a different height than the drivable surface; determining, based on the sensor data, a first surface line representing the drivable surface and a second surface line representing the non-drivable surface; determining, based on the first surface line and the second surface line, a separation point between the first surface line and the second surface line; and controlling the vehicle based at least in part on the separation point.

T: The one or more non-transitory computer-readable media as recited in paragraph S, wherein: the first surface line and the second surface line are determined based at least in part on the first point and the second point; the sensor data further represents a third point associated with the drivable surface and a fourth point associated with the non-drivable surface; the operations further comprise: determining, based on the third point and the fourth point, a third surface line representing the drivable surface and a fourth surface line representing the non-drivable surface; and determining, based on the third surface line and the fourth surface line, an additional separation point between the third surface line and the fourth surface line; and controlling the vehicle is further based at least in part on the additional separation point.

What is claimed is:

1. A method comprising:
   receiving sensor data from a sensor associated with a vehicle, the sensor data representing a first point associated with a drivable surface and a second point associated with a non-drivable surface at a different height than the drivable surface;
   determining, based on the sensor data, a first surface line representing the drivable surface and a second surface line representing the non-drivable surface;
   determining, based on the first surface line and the second surface line, a separation point between the first surface line and the second surface line, wherein the separation point comprises a boundary between the drivable surface and the non-drivable surface; and
   controlling the vehicle based at least in part on the separation point.

2. The method as recited in claim 1, wherein:
   the first surface line and the second surface line are determined based at least in part on the first point and the second point;
   the sensor data further represents a third point associated with the drivable surface and a fourth point associated with the non-drivable surface;
   the method further comprises:
      determining, based on the third point and the fourth point, a third surface line representing the drivable surface and a fourth surface line representing the non-drivable surface; and
      determining, based on the third surface line and the fourth surface line, an additional separation point between the third surface line and the fourth surface line; and
   controlling the vehicle is further based at least in part on the additional separation point.

3. The method as recited in claim 1, further comprising: generating a spatial line using the first point and the second point,
wherein determining the first surface line and the second surface line are based at least in part on the spatial line.

4. The method as recited in claim 3, further comprising:
   determining that the first point is located within a distance range from the vehicle; and
   determining that the second point is located within the distance range,
   and wherein generating the spatial line using the first point and the second point is based at least in part on the first point being located within the distance range and the second point being located within the distance range.

5. The method as recited in claim 1, wherein receiving the sensor data occurs at a first time, and wherein the method further comprises:
   receiving, at a second time, additional sensor data from the sensor, the additional sensor data representing at least a third point associated with the drivable surface and a fourth point associated with the non-drivable surface,
   and wherein determining the first surface line and the second surface line is further based at least in part on the additional sensor data.

6. The method as recited in claim 1, further comprising:
   determining a distance between the first point associated with the drivable surface and the second point associated with the non-drivable surface;
   determining that the distance is equal to or greater than a threshold distance; and
   determining that the separation point is associated with a curb based at least in part on the distance being equal to or greater than the threshold distance.

7. The method as recited in claim 1, further comprising:
   determining a first probability associated with the first point;
   determining that the first probability is equal to or greater than a threshold probability;
   determining a second probability associated with the second point; and
   determining that the second probability is equal to or greater than the threshold probability,
   and wherein determining the first surface line and the second surface line uses at least the first point and the second point based at least in part on the first probability being equal to or greater than the threshold probability and the second probability being equal to or greater than the threshold probability.

8. The method as recited in claim 1, further comprising:
   determining that the first point is associated with the driving surface; and
   determining that the second point is associated with the non-drivable surface,
   and wherein determining the first surface line and the second surface line uses at least the first point and the second point based at least in part on the first point being associated with the driving surface and the second point being associated with the non-drivable surface.

9. The method as recited in claim 1, further comprising:
   determining that the first point is located within a threshold distance to the vehicle; and
   determining that the second point is located within the threshold distance,
   and wherein determining the first surface line and the second surface line uses at least the first point and the second point based at least in part on the first point being located within the threshold distance and the second point being located within the threshold distance.

10. The method as recited in claim 1, wherein determining the separation point comprises at least:
    determining a first difference between a first location associated with the first point the first surface line;
    determining a second difference between a second location associated with the second point and the second surface line;
    determining an energy based at least in part on the first difference and the second difference; and
    determining the separation point based at least in part on the energy.

11. The method as recited in claim 1, further comprising:
    determining, based at least in part on the sensor data, a third surface line representing the drivable surface and a fourth surface line representing the non-drivable surface;
    determining, based on the third surface line and the fourth surface line, an additional separation point between the third surface line and the fourth surface line; and
    generating, based at least in part on the separation point and the additional separation point, a curve that represents a curb,
    wherein controlling the vehicle is based at least in part on the curve.

12. The method as recited in claim 11, further comprising:
    generating an additional curve based at least in part on the separation point and the additional separation point;
    determining a first position associated with the separation point on the additional curve;
    determining an energy based at least in part on the first position associated with the separation point and a second position associated with the additional separation point;
    determining a third position for the separation point based at least in part on the energy; and
    generating the curve based at least in part on the third position.

13. The method as recited in claim 1, further comprising:
    determining a first coordinate associated with the first point;
    determining a second coordinate associated with the second point; and
    determining a height of a curb based at least in part on the first coordinate and the second coordinate.

14. One or more non-transitory computer-readable media storing instructions that, when executed by one or more processors, cause the one or more processors to perform operations comprising:
    receiving sensor data from a sensor associated with a vehicle, the sensor data representing a first point associated with a drivable surface and a second point associated with a non-drivable surface at a different height than the drivable surface;
    determining, based on the sensor data, a first surface line representing the drivable surface and a second surface line representing the non-drivable surface;
    determining, based on the first surface line and the second surface line, a separation point between the first surface line and the second surface line, wherein the separation point comprises a boundary between the drivable surface and the non-drivable surface; and
    controlling the vehicle based at least in part on the separation point.

15. The one or more non-transitory computer-readable media as recited in claim 14, wherein:
    the first surface line and the second surface line are determined based at least in part on the first point and the second point;
    the sensor data further represents a third point associated with the drivable surface and a fourth point associated with the non-drivable surface;
    the operations further comprise:
        determining, based on the third point and the fourth point, a third surface line representing the drivable surface and a fourth surface line representing the non-drivable surface; and
        determining, based on the third surface line and the fourth surface line, an additional separation point between the third surface line and the fourth surface line; and
    controlling the vehicle is further based at least in part on the additional separation point.

16. A system comprising:
    one or more processors; and
    one or more non-transitory computer-readable media storing instructions that, when executed by the one or more processors, cause the one or more processors to perform operations comprising:
        receiving sensor data from a sensor associated with a vehicle, the sensor data representing a first point associated with a drivable surface and a second point associated with a non-drivable surface at a different height than the drivable surface;
        determining, based on the sensor data, a first surface line representing the drivable surface and a second surface line representing the non-drivable surface;
        determining, based on the first surface line and the second surface line, a separation point between the first surface line and the second surface line, wherein the separation point comprises a boundary between the drivable surface and the non-drivable surface; and
        controlling the vehicle based at least in part on the separation point.

17. The system of claim 16, wherein:
    the first surface line and the second surface line are determined based at least in part on the first point and the second point;
    the sensor data further represents a third point associated with the drivable surface and a fourth point associated with the non-drivable surface;
    the operations further comprise:
        determining, based on the third point and the fourth point, a third surface line representing the drivable surface and a fourth surface line representing the non-drivable surface; and
        determining, based on the third surface line and the fourth surface line, an additional separation point between the third surface line and the fourth surface line; and
    controlling the vehicle is further based at least in part on the additional separation point.

18. The system of claim 16, the operations further comprising:
    generating a spatial line using the first point and the second point,
    wherein determining the first surface line and the second surface line are based at least in part on the spatial line.

19. The system of claim 18, the operations further comprising:
- determining that the first point is located within a distance range from the vehicle; and
- determining that the second point is located within the distance range,
- and wherein generating the spatial line using the first point and the second point is based at least in part on the first point being located within the distance range and the second point being located within the distance range.

20. The system of claim 16, wherein receiving the sensor data occurs at a first time, and wherein the operations further comprise:
- receiving, at a second time, additional sensor data from the sensor, the additional sensor data representing at least a third point associated with the drivable surface and a fourth point associated with the non-drivable surface,
- and wherein determining the first surface line and the second surface line is further based at least in part on the additional sensor data.

* * * * *